Feb. 8, 1955     C. W. SINCLAIR     2,701,628
BRAKE ADJUSTING MECHANISM
Filed Feb. 18, 1952
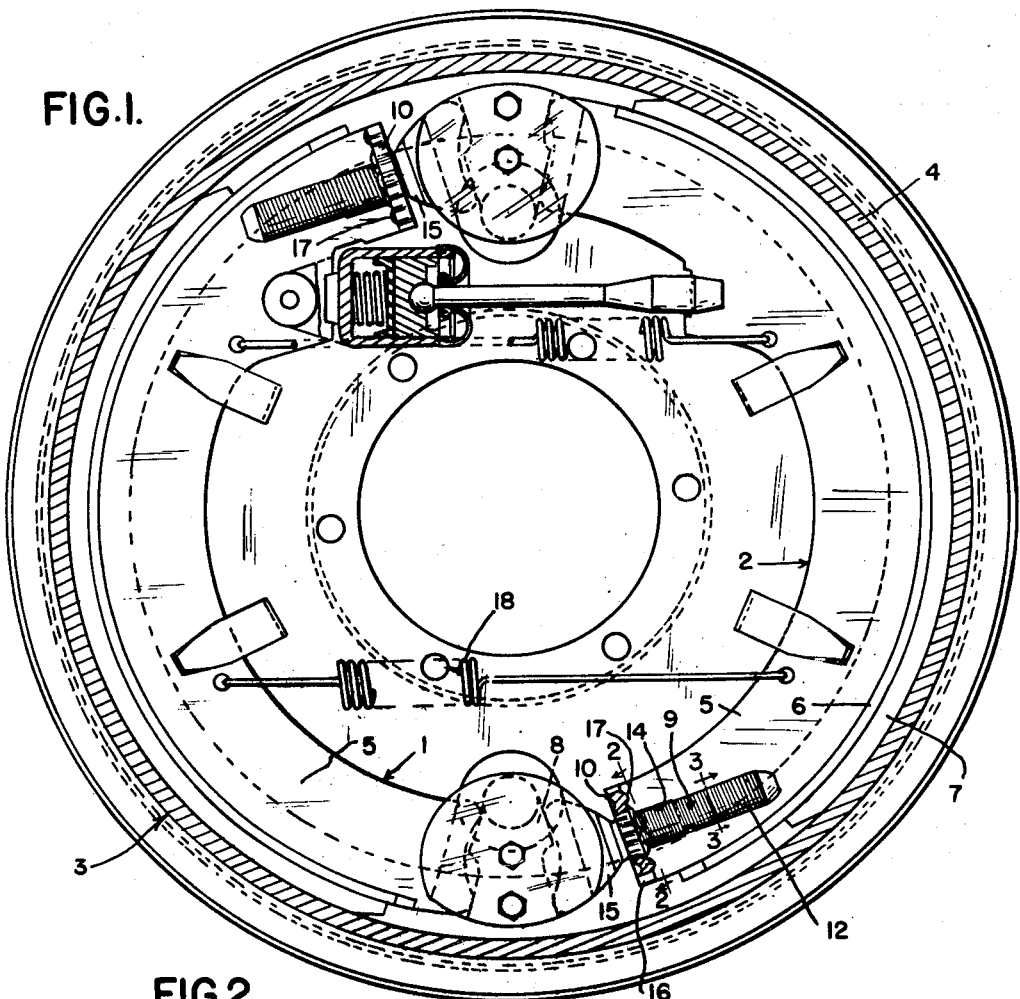
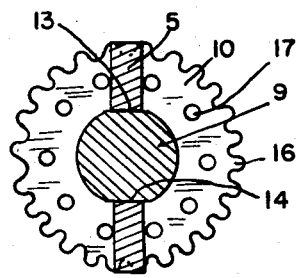
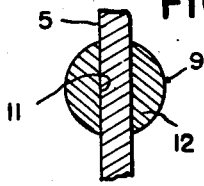
*INVENTOR.*
CHARLES W. SINCLAIR
BY
ATTORNEYS United States Patent Office 2,701,628
Patented Feb. 8, 1955

2,701,628

BRAKE ADJUSTING MECHANISM

Charles W. Sinclair, Detroit, Mich., assignor to Kelsey-Hayes Wheel Company, Detroit, Mich., a corporation of Delaware Application February 18, 1952, Serial No. 272,010

5 Claims. (Cl. 188—79.5)

The invention relates to brakes and refers more particularly to brake adjusting mechanisms.

The invention has for one of its objects to provide a simple, effective construction of adjusting mechanism for a webbed brake friction element.

The invention has for another object to provide the adjusting mechanism with a rotatably adjustable thrust element having spaced projections at opposite sides of a web of the brake friction element to normally retain the thrust element in adjusted position.

With these and other objects in view the invention resides in the novel features of construction and combinations and arrangements of parts as more fully hereinafter set forth.

In the drawing:

Figure 1 is a side elevation partly in section of a portion of a brake showing an adjusting mechanism embodying the invention;

Figures 2 and 3 are cross sections on the lines 2—2 and 3—3 of Figure 1.

The adjusting mechanism is designed particularly for use in a brake of the internal expanding type which, as illustrated, comprises the brake friction elements 1 and 2 and the brake drum 3 having the annular brake flange 4. The friction elements are webbed brake shoes preferably of T-shaped cross section having the webs 5, the arcuate platforms 6 and the linings 7 secured to the platforms. 8 is a pivotal lever between adjacent ends of the shoes for transmitting thrust from one of the shoes to the other when the shoes are urged by an actuator (not shown) between the other adjacent ends of the shoes into contact with the brake flange while the drum is rotating.

To secure substantially uniform clearance between the lining of the shoe 2 and the brake flange 4, I have provided an adjusting mechanism comprising the bolt 9 and the nut 10 rotatably adjustable on the bolt. The bolt has the diametral slot 11 extending from one end for receiving the web 5, the slot forming the furcations 12 at opposite sides of the web. The bolt also has the diametrically opposite flat sides 13 in alingment with the slot and slidably engaging the opposite edges 14 of a slot formed in the web 5. Furthermore, the bolt has beyond the web 5 the head 15 which abuts the lever 8. The bolt thus forms a thrust element operating upon the lever. The nut 10 is threaded upon the bolt between the head 15 and the end of the web 5 and its side adjacent the end of the web abuts the same so that the nut forms a thrust element operating upon the end of the shoe web. The periphery of the nut is formed with the teeth 16 for engagement by a suitable tool, such as a screw driver, to rotatably adjust the nut. Also, for the purpose of normally retaining the nut in its various positions of rotative adjustment, it is formed with the annular series of rounded projections 17 extending transversely from the side abutting the end of the web. These projections are rounded bosses displaced from the material forming the nut and they are angularly spaced the same distance apart which is approximately the thickness of the web so that adjacent projections will be located at opposite sides of the web and either in engagementt herewith or closely adjacent thereto.

For retracting the shown end portions of the shoes 1 and 2 and holding the same in their released positions with the shoe 1 abutting the lever 8 and the head 15 of the bolt 9 abutting the lever 8, there is the coil spring 18 having its ends connected to the end portions of the shoes.

In operation, it will be seen that the spring normally holds the end of the web 5 of the shoe 2 against the side of the nut 10 and between adjacent projections or bosses 17 and that the nut 10 operates upon the bolt 9 to hold the head 15 against the lever 8. Also, the spring holds the end of the web 5 of the shoe 1 against the lever 8. To adjust the shoe 2 the nut is rotated upon the bolt during which time the bosses successively ride over the end of the web and the nut is compelled to move away from the end of the web and to return into abutment therewith, the spring permitting the riding over and resiliently returning the nut.

What I claim as my invention is:

1. Adjusting mechanism for a brake friction element having a web, comprising a bolt having a diametral slot receiving the web and having an abutment beyond the web, and a rotatable nut threaded on said bolt and abutting the web and having an annular series of laterally extending projections angularly spaced from each other approximately the thickness of the web with adjacent projections at opposite sides of the web.

2. Adjusting mechanism for a brake friction element having a web, comprising a bolt having a diametral slot receiving the web and having an abutment beyond the end of the web, and a rotatably adjustable nut threaded on said bolt and abutting the end of the web and having an annular series of projections with adjacent projections at opposite sides of the web.

3. Adjusting mechanism for a brake friction element having a web, comprising a bolt having furcations at opposite sides of the web and having an abutment beyond the end of the web, and a rotatably adjustable nut threaded on said bolt and having a side abutting the end of the web and also having bosses projecting laterally from said side and located at opposite sides of the web.

4. Adjusting mechanism for a spring retracted brake friction element having a web, comprising a bolt having an abutment at one end and slidably engaging and guided by an end portion of the web, and a nut threaded on said bolt for adjustment longitudinally thereof, said nut having a side abutting said end portion of the web and also having an annular series of bosses projecting laterally from said side and angularly spaced from each other approximately the thickness of the web with adjacent bosses located at opposite sides of the web.

5. Adjusting mechanism for a brake friction element having a web, comprising a thrust element slidably engaging and guided by an end portion of the web and having an abutment beyond said end portion, a second thrust element threaded on the first-mentioned thrust element and abutting said end portion and having an annular series of projections with adjacent projections at opposite sides of the web.

References Cited in the file of this patent

UNITED STATES PATENTS

| | | |
|---|---|---|
| 1,789,392 | Sneed | Jan. 20, 1931 |
| 1,848,259 | McConkey | Mar. 8, 1932 |
| 2,554,301 | House | May 22, 1951 |